United States Patent [19]

Sahni

[11] Patent Number: 4,490,852
[45] Date of Patent: Dec. 25, 1984

[54] IMAGE CAPTURING APPARATUS
[75] Inventor: Ram N. Sahni, Ithaca, N.Y.
[73] Assignee: NCR Corporation, Dayton, Ohio
[21] Appl. No.: 322,336
[22] Filed: Nov. 17, 1981
[51] Int. Cl.³ .......................... G06K 9/20; G06K 9/32
[52] U.S. Cl. ....................................... 382/48; 382/22; 358/282
[58] Field of Search ............................ 382/48, 45, 22; 358/282

[56] References Cited
U.S. PATENT DOCUMENTS
3,717,848  2/1973  Irvin et al. ............................ 382/48

Primary Examiner—John C. Martin
Assistant Examiner—Michael D. Parker
Attorney, Agent, or Firm—J. T. Cavender; Wilbert Hawk, Jr.; Richard W. Lavin

[57] ABSTRACT

A hand held character scanning system is provided in which logic circuits are responsive to the generation of digitized data signals representing the character scanned together with the background area adjacent the character to determine if the data signals represent the scanning of a complete character. The signals are also used to determine the directions of scan together with raising an interrupt signal to a processor which performs a recognition operation on the data signals generated.

14 Claims, 10 Drawing Figures

IMAGE CAPTURING APPARATUS

BACKGROUND OF THE INVENTION

The present invention relates to character recognition systems and more particularly to a method and apparatus for checking whether a complete image of the character is scanned and captured by a hand held scanning system.

Many character recognition systems currently available use the technique of "mask matching" in recognizing the unknown character. This technique involves the matching or correlation between the character to be recognized and a set of standard character masks. In scanning the unknown character, scanning means such as hand held optical readers generate electrical signals representing both the character scanned and the background scanned. To provide sufficient information to the character recognition logic to recognize the character scanned, the complete character must be scanned together with information as to the direction of the scanning of the character. It has been found that if the scanner is moved at an angle to the characters on the documents, portions only of the characters are scanned resulting in data which is unable to be used in recognizing the characters. Prior scanning systems have utilized costly complex circuits to check if the complete character has been scanned and to determine the direction of scan. These circuits are usually located in the processor which performs the recognition process. It is therefore the principal object of this invention to provide a low cost system for capturing the complete image of a character scanned in a predetermined direction by an optical scanner unit. It is a further object of this invention to provide such a system for disabling the transfer of data to a processor when the data presented does not completely describe the scanned character. It is another object of this invention to provide a system for indicating the direction of scan of the scanning unit.

SUMMARY OF THE INVENTION

In order to carry out these objects, there is provided a hand held scanning system which is used to scan a character in a predetermined direction on a record member. The character is bordered by a white background. Analog signals are generated representing the white background that occur at the start and at the completion of the scanning of the character together with signals representing the black portion of a character and signals representing a gray portion which is a composite of white and black signals for use in determining if the signals represent a complete character. The analog signals are processed and digitized for storing in latch members prior to transfer to a digital processor wherein the recognition of the scanned character takes place. The latch members are enabled to store the signals only if the signals represent a complete image of the character scanned in the predetermined direction. Logic circuitry utilizing the background signals and the character signals control the operation of the latch members together with raising an interrupt to the processor indicating a valid read operation. Circuitry is also included which is enabled by the signals to indicate the direction of scan.

BRIEF DESCRIPTION OF THE DRAWINGS

Additional advantages and features of the present invention will become apparent and fully understood from a reading of the following description, taken together with the annexed drawings.

FIG. 7 is a diagram showing the manner in which FIGS. 6A and 6B are arranged with respect to each other to form the block diagram;

DESCRIPTION OF THE PREFERRED EMBODIMENT

Figure 1:
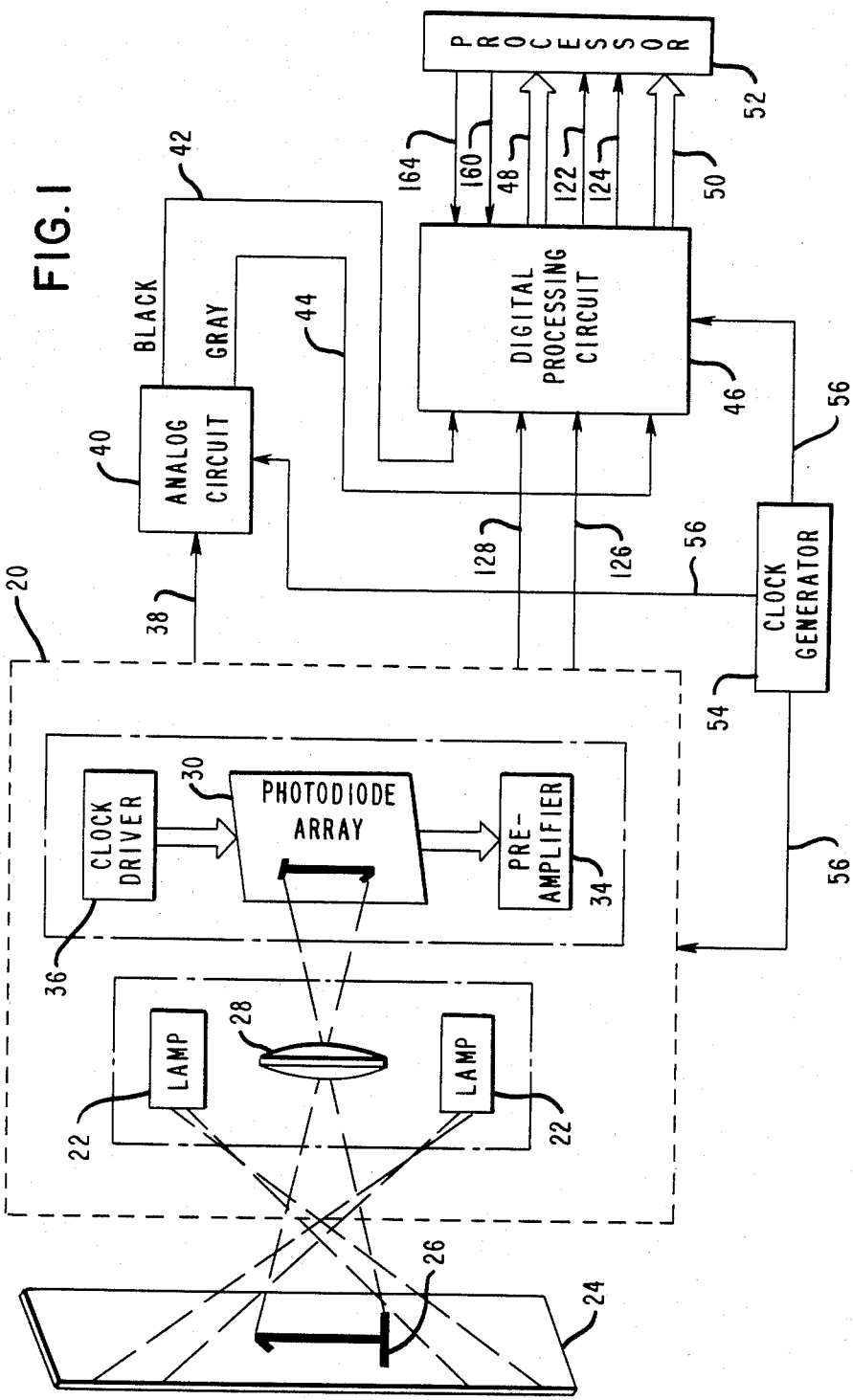
FIG. 1 is a block diagram of the character recognition system of the present invention.
Figure 2:
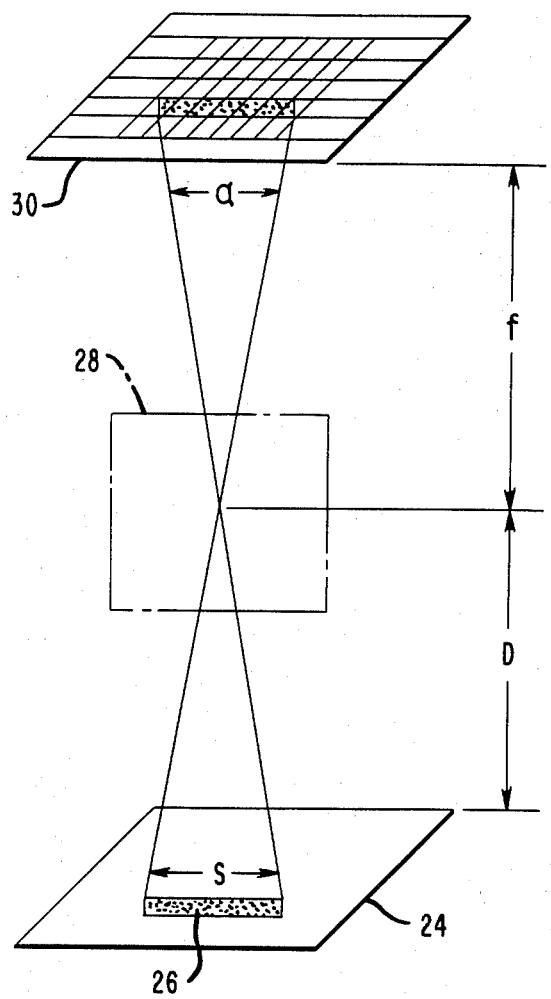
FIG. 2 is a diagrammatic drawing of the location of the lenses of the spot scanner unit from the character being scanned to properly locate the image of the character on a photodiode array.
Figure 3:
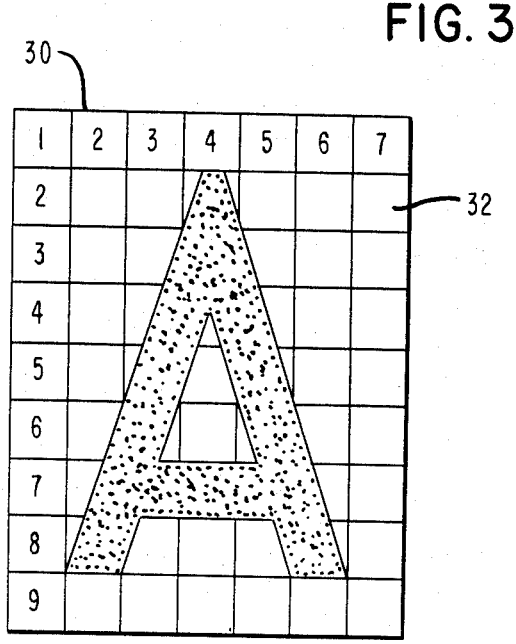
FIG. 3 is a diagrammatic drawing showing the location of the letter A on the photodiode array.
Figure 4:
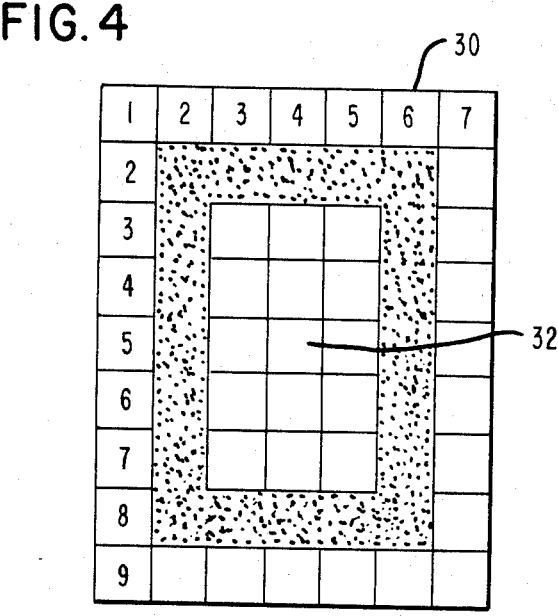
FIG. 4 is a diagrammatic drawing of the location of the letter O on the photodiode array.

Referring to FIG. 1, there is shown a block diagram of the character recognition system of the present invention. Included in the system is a hand-held optical scanning unit 20 which includes a pair of light-emitting diodes 22 for directing light beams onto a tag 24 or other type of record member on which is located a character 26 to be read. The light beams directed at the tag 24 are reflected from the tag and through a lens 28 which focuses the image of the sensed character 26 onto a photodiode array 30. As shown in FIG. 2, the lens 28 which has a focal length f is located at a distance D from the tag 24, enabling the lens to focus the sensed character 26 on the array 30 so as to fill a desired matrix of photodiode cells. This arrangement is illustrated in FIGS. 3 and 4 wherein the array 30 of photodiode cells is selected to provide a 7×9 matrix of cells 32. FIG. 3 shows the location of the image of the character A on the array while FIG. 4 shows the location of the character O on the array. As will be described more fully hereinafter, the first and seventh columns of cells 32 in the array 30 are used in determining the capturing of the character 26 scanned and the direction of scan of the scanning unit 20 (FIG. 1).

Associated with the photodiode array 30 in the scanning unit 20 is a pre-amplifier unit 34 (FIG. 1) which amplifies the voltage pulses generated by any of the cells 32 and a clock driver 36 which clocks the amplified voltage signals of each row of cells serially over line 38 to an analog circuit unit 40. The circuit unit 40 detects whether each of the received signals identifies a black, gray, or white background being scanned; the black being at a prescribed voltage level representing a full character area portion being scanned, the gray being at a lesser voltage level representing a partial character area portion of the image scanned, and the white being at a zero voltage level and representing a white background, i.e. no character portion, being scanned. The cells adjacent a black cell if not black themselves will register as gray signals. The black signals appearing on line 42 and the gray signals appearing on line 44 are transmitted to a digital processing circuit 46 which latches only that data pertaining to the complete registering of the character 26 on the array 30 (FIG. 2). The black and gray data representing the unknown character is transmitted over buses 48 and 50 together with information regarding the scanning direction of the scanning unit 20 to a processor 52 which matches known character templates with the data representing the unknown character to determine the unknown character in a manner that is well-known in the art. A clock generator 54 supplies various clock signals over lines 56 to the system for the logical operation thereof.

Figure 5:
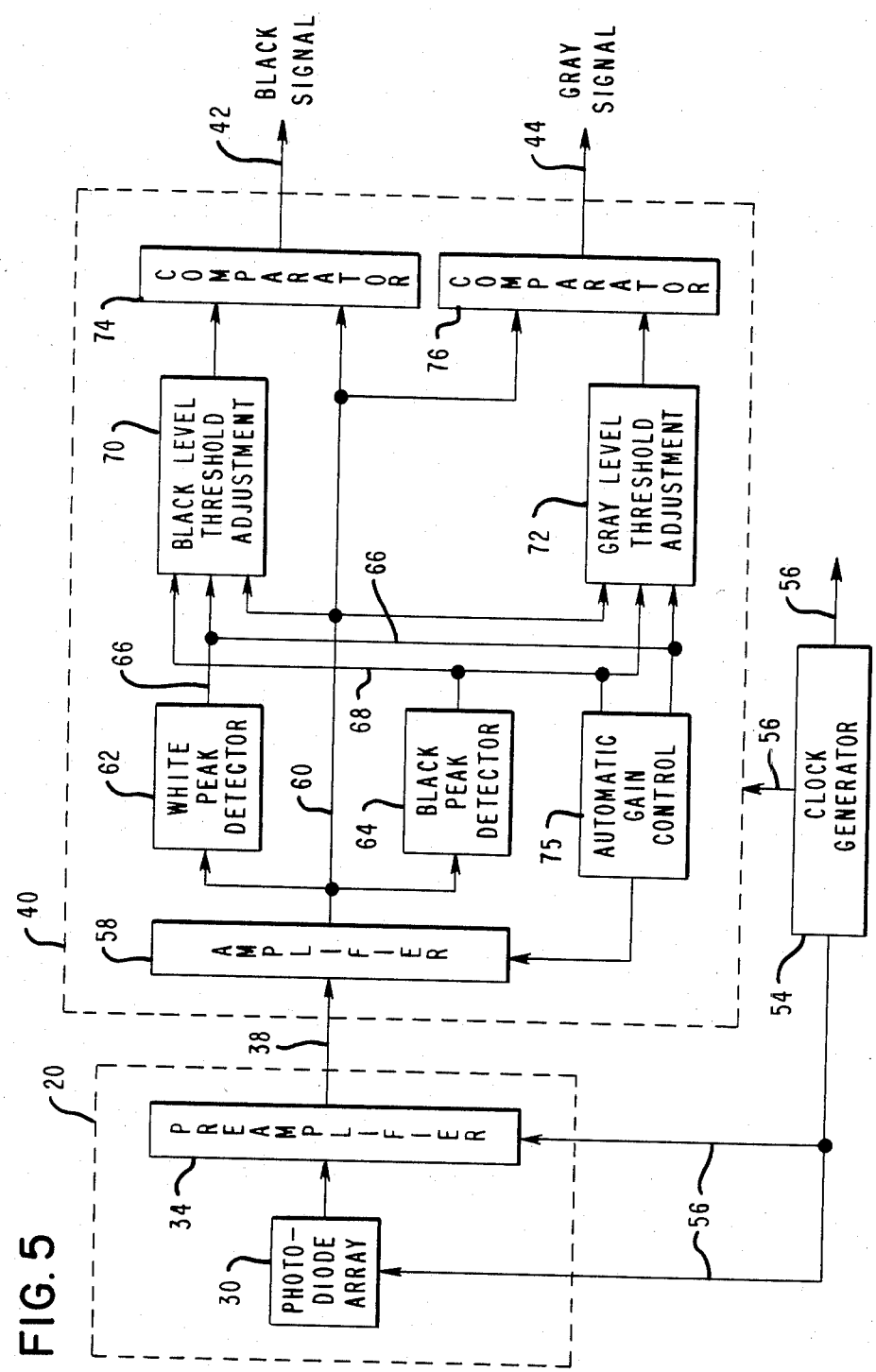
FIG. 5 is a block diagram of the analog circuit of FIG. 1.

Referring now to FIG. 5, there is shown a block diagram of the scanning unit 20 and the analog circuit 40 (FIG. 1). As previously described, the scanning unit 20 includes the array 30 of photodiode cells 32 and the preamplifier 34, both receiving clock signals from the clock generator 54 over lines 56. The analog signals representing the scanned image appearing on line 38 are amplified by the amplifier 58 of the analog circuit 40 and are transmitted over line 60 to a white peak detector 62 and a black peak detector 64. The output signal of the white peak detector 62, appearing on line 66, and the output signal of the black peak detector 64, appearing on line 68, are both inputted into a black level threshold adjustment circuit 70, a gray level threshold, adjustment circuit 72 and an automatic gain control circuit 75. The automatic gain control circuit adjusts the output level of the amplifier 58 to maintain the voltage level of the output signals of the cells 32 (FIGS. 3 and 4) at a value enabling the white and black peak detectors 62 and 64 to detect the peak voltage levels of the signals appearing on line 60. To distinguish the black and gray areas of the image from the white background area, the threshold adjustment circuits 70 and 72, which may comprise programmable amplifiers, will output the black and gray reference signals in response to receiving the peak detector signals over lines 66 and 68 to a pair of comparators 74 and 76 which compare the reference signals with the analog signals appearing on line 60 representing the signal developed in each of the cells 32 (FIGS. 3 and 4). The black signal level will have a value greater than 3.5 volts, the gray signal level will have a value greater than 2.5 volts and, as mentioned previously, a white signal level will be at zero volts. The comparator 74 will output a digital signal over line 42 representing a black voltage level while the comparator 76 will output a signal over line 44 representing a gray voltage level.

Figure 6A:
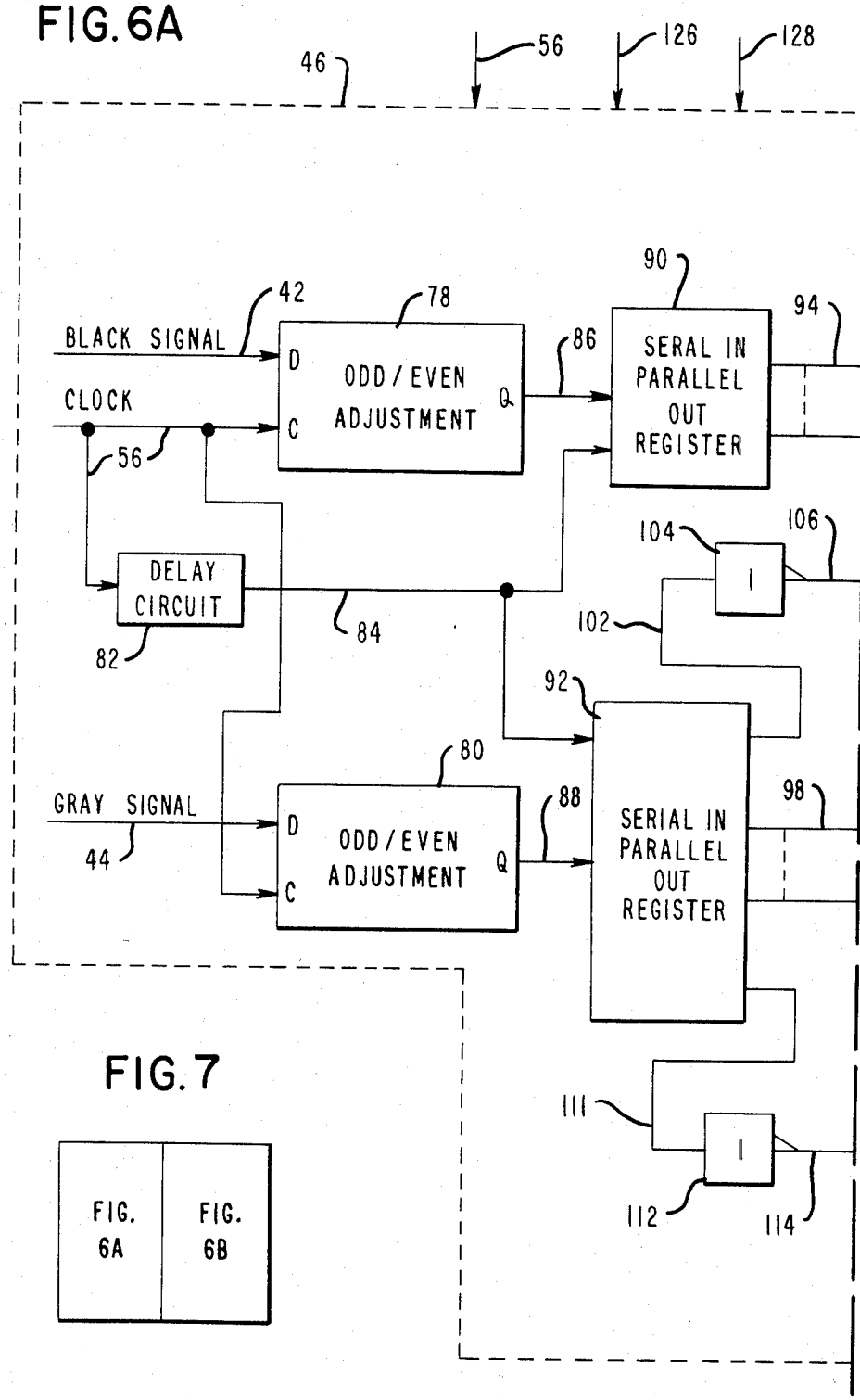
FIGS. 6A and 6B together form a block diagram of the digital processing circuit of FIG. 1.
Figure 7:
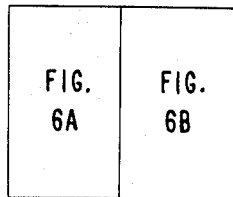
Figure 6B:
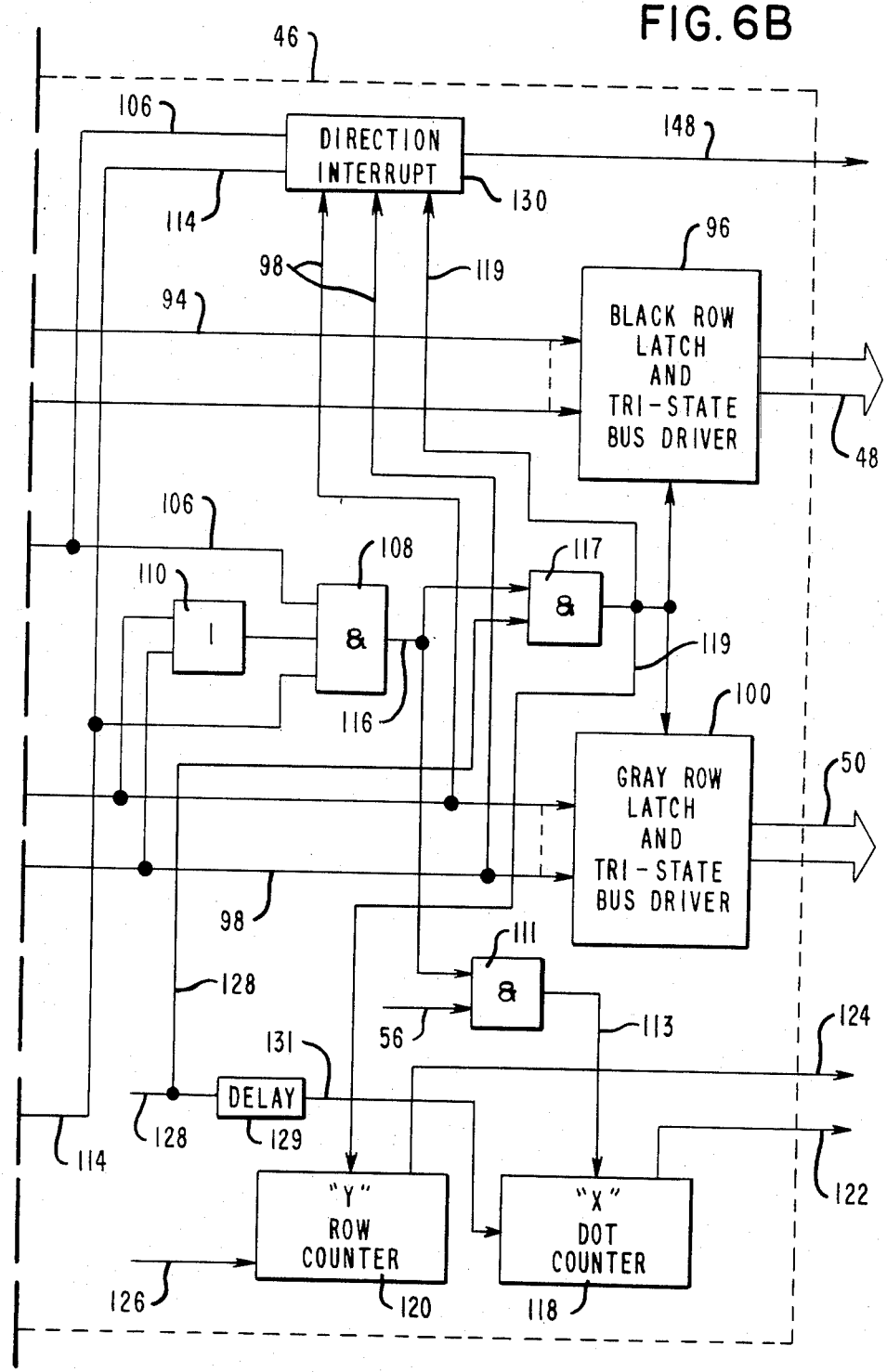

Referring now to FIGS. 6A and 6B, there is shown a block diagram of the digital processing circuit 46 (FIG. 1). Included in the circuit are a pair of odd/even adjustment circuits 78 and 80 which will output digital signals having the same width. Because of the construction of the photodiode cells 32, odd and even rows of photodiode cells will not produce signals of uniform width. The adjustment circuits 78 and 80, which may comprise D-type flip-flops, will output the received black or gray signals when clocked by the same clock signals appearing on line 56 and transmitted from the clock generator 54 (FIG. 1). The clock signals appearing on line 56 are also inputted into a delay circuit 82 which may comprise a series of inverter gates which, after a predetermined time period, will output the clock signals for controlling the width of the black and grey signals by clocking the flip-flops 78 and 80 and thereby enabling the constant width black digital signals appearing on the output line 86 and the gray digital signals appearing on the output line 88 to be inputted into a pair of serial-in-parallel-out shift registers 90 and 92. The shift register 90 outputs any of the binary bits two through six of the seven binary bits representing the output of each row of photodiode cells 32 (FIGS. 3 and 4) which have a voltage level representing a black signal over the output lines 94 to a latch and bus driver circuit 96 (FIG. 6B). In a similar manner, the shift register 92 will output any of the binary bits two through six over lines 98 representing a gray signal level to a second latch and bus driver circuit 100. The shift register 92 will also output the binary bit representing the first cell 32 in each row of the array 30 (FIGS. 3 and 4) over line 102 through an inverter 104 and over line 106 to one input of an AND gate 108. Normally this binary bit appearing on line 102 will be zero representing a white signal which when inverted by the inverter 104 will be high when inputted into the AND gate 108. In a similar manner, the AND gate 108 also receives binary bits two through six from lines 98 of the shift register 92, which signals, indicating the presence of a character, are transmitted through the OR gate 110. The AND gate 108 further receives binary bit seven from the register 92, which signal is normally zero and which is transmitted over line 111 and inverted by the inverter 112 (FIG. 6A) and then transmitted over line 114 to the AND gate 108. As will be explained more fully hereinafter, if the binary bits one and seven are of the proper voltage signal level (zero) together with any of the binary bits two through six having a gray signal level indicating that a character has been properly scanned, the AND gate 108 will output a high clocking signal CLK over line 116 to one input of an AND gate 117. The AND gate 117 is enabled by a signal appearing on line 128 outputted from the scanning unit 20 (FIG. 1) representing an end of row signal. Such signal on line 128 may be outputted by a counter and occurs at the end of seven clock times. The output signal of AND gate 117 appearing on line 119 is ued to clock the latches 96 and 100 resulting in the latching of the binary bits representing the black and gray signals appearing on lines 94 and 98, respectively.

The clocking signal appearing on line 116 (FIG. 6B) is also inputted into an AND gate 111 which also receives the clock signals appearing on line 56 from the clock generator 54 (FIG. 5). The clock signals outputted by the AND gate 111 are transmitted over line 113 to clock the binary counter 118 which counts the number of dots or binary bits representing the gray signals outputted by the scanning unit 20 occurring in a row of cells 32 (FIGS. 3 and 4). The clock signals appearing on line 119 are also inputted into a counter 120 which counts the number of rows scanned by the scanning unit 20 (FIG. 1). The output counts of the counters 118 and 120 are transmitted over lines 122 and 124 respectively to the processor 52 (FIG. 1) for use by the processor in recognizing the unknown characters. The scanning unit 20 (FIG. 1) generates end of scan signals over line 126 resetting the row counter 120 for a new scanning operation. The bit or dot counter 118 is reset by the end of row signal appearing on line 128 and which is delayed by a delay circuit 129 enabling the processor 52 to read the output signals of the counters 118 and 120 appearing on lines 122 and 124 respectively. The delayed signal of line 128 is transmitted over line 131 to the dot counter 118.

The bit signals outputted over lines 98, 102 and 111 by the register 92 (FIG. 6A) are also inputted over lines 98, 106 and 114 into a direction and interrupt circuit 130

Figure 8:
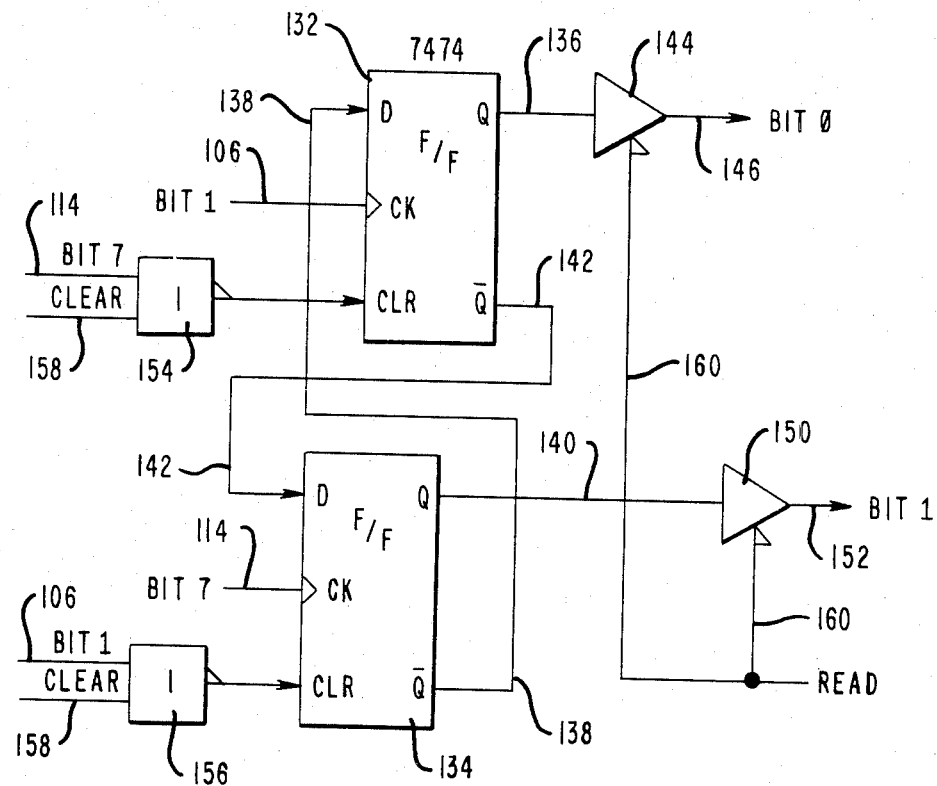
FIG. 8 is a block diagram of the direction and interrupt circuit of FIG. 6B.

(FIG. 6B). As disclosed in FIG. 8, the direction and interrupt circuit 130 includes a pair of 7474 D-type flip-flops 132 and 134. The flip-flop 132 is clocked by the inverted bit one signal appearing on line 106 to output over its Q output line 136 the signal appearing on the D input line 138 which is the $\overline{Q}$ output of the flip-flop 134. In a similar manner, the flip-flop 134 is clocked by the inverted bit seven signal appearing on line 114 to output over its Q output line 140 the signals appearing on the D input line 142 which correspond to the $\overline{Q}$ output of the flip-flop 132. With this arrangement, if the scanning unit 20 is scanning the tag 24 in a left-to-right direction, the bit one signal appearing on line 106 will go high and thus clock the flip-flop 132 which outputs a high signal over line 136, through the tri-state driver 144 and out over line 146 which is part of a data bus 148 (FIG. 6B) for transmission to the processor 52 (FIG. 1) as a status bit over bus 48.

At the completion of the scanning sequence by the unit 20, the bit seven signal appearing on line 114 will go high, thereby clocking the flip-flop 134 which outputs the low signal from the $\overline{Q}$ output of the flip-flop 132 appearing on line 142 over Q output line 140 to the tri-state driver 150. The driver 150 will output the signal over line 152, bus 148 (FIG. 6B) and bus 48 (FIG. 1) to the processor 52. Both tri-state drivers 144 and 150 are enabled to transmit the data bits over the output lines 146 and 152 respectively. The clocking of either of the flip-flops 132 or 134 results in the resetting of the other flip-flop. The bit seven signal appearing on line 114 is transmitted through a NOR gate 154 to the clear input of the flip-flop 132 while the bit one signal appearing on line 106 is transmitted through a NOR gate 156 to the clear or reset input of the flip-flop 134. If the scanning unit 20 (FIG. 1) is scanning the tag 24 in a right-to-left direction, the signal appearing on line 136 (FIG. 8) will be low while the signal appearing on line 140 will be high. A CLEAR signal generated by the processor 52 for resetting both the flip-flops 132 and 134 at the conclusion of a successful scanning operation appears on the input lines 158 to the NOR gates 154 and 156.

Figure 9:
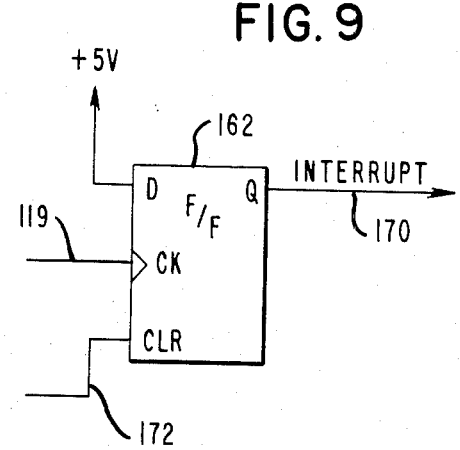
FIG. 9 is a block diagram of the interrupt circuit of FIG. 6B.

The tri-state drivers 144 and 150 are enabled by a signal READ generated by the processor 52 over lines 160 (FIG. 8) in response to an interrupt signal generated by the direction and interrupt circuit 130 at the conclusion of the successful capture of the image by the photodiode array 30. As shown in FIG. 9, the circuit 130 further includes a 7474 D-type flip-flop 162 which is clocked by the signal appearing on line 119 and outputted by the AND gate 117 (FIG. 6B). Clocking of the flip-flop 162 results in the outputting of the signal INTERRUPT over the Q output line 170 of the data bus 148 to the processor 52 notifying the processor of a successful scanning operation. The processor 52, in response to receiving the INTERRUPT signal, will read the black and gray data outputted over busses 48 and 50 by the latches 96 and 100 (FIG. 6B). The processor 52 generates the enabling signal READ over line 160 (FIG. 8) to the tri-state drivers 144 and 150 allowing the processor 52 to read the status bits appearing on the output lines 146 and 152 in order to determine the scanning direction for use in recognizing the unknown character. The processor 42 will clear the flip-flop 162 by transmitting an interrupt acknowledge signal over line 164 (FIG. 1).

In the operation of the system, scanning of the tag 24 (FIG. 1) by the scanning unit 20 results in the clock driver 36 serially clocking out the binary bit signals generated by the photodiode cells 32 of the array 30 over line 38 to the amplifier 58 of the analog circuit 40 (FIG. 5), which amplifies and transmits the signal to the peak detectors 62 and 64 thereof. Upon detecting a white or black signal level, the detectors 62 and 64 will output the signals to the threshold adjustment circuits 70 and 72. The circuit 70 produces a black reference voltage of a minimum 3.5 volts level while the circuit 72 produces a gray reference voltage signal having a minimum 2.5 volts level. These signals are used by the comparators 74 and 76 to compare the signals outputted by the amplifier 58 enabling the comparator 74 to output a digital signal over line 42 representing a black bit scanned by the scanning unit 20 and the comparator 76 to output a gray digital signal over line 44 (FIG. 5).

The width of both the gray and black digital signals are standardized by the adjustment circuits 78 and 80 and loaded into the serial-to-parallel registers 90 and 92 (FIG. 6A). In order to store the binary bits appearing on the output lines of the registers 90 and 92, the binary bit representing column one appearing on line 102 and the binary bit representing column seven appearing on line 111 must go low indicating the sensing of the white border adjacent the character (FIGS. 3 and 4) and the capture of the image of the character 26 within the photodiode cell columns two through six (FIGS. 3 and 4). In addition, one of the binary bits located within the photodiode cell columns two through six must be black as indicated by a gray signal appearing on one of the output lines 98 of the register 92, indicating a portion of the image of the character has been sensed. If these three conditions are met, the AND gate 108 will output the clock signal CLK to the AND gate 117 which is enabled by the end of row signal appearing on line 128. The output clock signal of the AND gate 117 appearing on line 119 (FIG. 6B) is transmitted to the latches 96 and 100 thereby latching the black and gray signals of each row of photodiodes cells 32 appearing on the output line of the registers 90 and 92. This data is read by the processor 52 when notified of its availability.

The binary data signals associated with columns one and seven (FIGS. 3 and 4) of the photodiode cells 32 are transmitted to the direction and interrupt circuit 130 which outputs a pair of status bits over lines 146 and 152 (FIG. 8) indicating the direction of scan by the scanning unit 20 provided that the background data is found in either bit 1 or bit 7 of each row in the arrays. The zero binary signals of column one and column seven of cells 32 together with the generation of a black or gray signal in one of the columns two through six thereof will result in the raising of the signal INTERRUPT over line 170 (FIG. 9) notifying the processor 52 that data pertaining to the scanned character 26 is available for processing. This sequence is repeated for each row of cells 32 (FIGS. 3 and 4) until the signal output of all the cells has been transmitted to the processor 52 for storage therein.

It will be seen from this arrangement, that in each row of data signals representing the output signals of a row of photodiode cells 32 (FIGS. 3 and 4), the sensing of the white borders of the character 26 as represented by the zero voltage level in the first and seventh column of cells 32 must occur together with the generation of a voltage level representing a black cell intermediate the first and seventh cell before the signals are latched.

While we have shown and described one embodiment of the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

I claim:

1. A character scanning system for generating data used in recognizing an unknown character comprising;

scanning means for scanning a document including a plurality of scanning members generating voltage signal levels representing a multi-column, multi-row image of the unknown character wherein the voltage level generated by the first and last scanning member in each row represents the background area of the character when the character is centered;

means for detecting white, black and grey signal levels in said voltage signal levels in which the white signal level represents the background data while the black and grey signal levels represent character data;

means responsive to the detection of said white, black and grey signal levels for generating first and second digital signals each representing background area and character data;

first storage means connected to said generating means for serially reading in said first and second digital signals and for outputting said first and second digital signals in parallel;

first logic circuit means connected to said first storage means and enabled by the second digital signals to output a first control signal;

and second storage means connected to said first storage means and enabled by said first control signal for storing said first digital signal and a portion of said second digital signal for use by the character recognition system in recognizing the character scanned.

2. The character scanning system of claim 15 in which first and last bits of said second digital signal contain the white signal level representing the background area of the character when the character is centered and the stored portion of said second digital signal represents character data.

3. The character scanning system of claim 18 which further includes second logic circuit means generating second and third control signals indicating the direction of scan of the scanning means in response to receiving the white signal level contained in the first and last bits of said second digital signal.

4. The character scanning system of claim 3 in which said first logic means includes a first gating means receiving the white signal level contained in the first and last bits of said second digital signal and said second digital signal for outputting said first control signal when said inputted digital signals are the same.

5. The character scanning system of claim 4 in which said first storage means comprises a first and second serial-in parallel-out register, said first register outputting said first digital signal and said second register outputting the second, digital signal.

6. The character scanning system of claim 5 in which said first logic circuit means includes a plurality of inverter circuits connected to said second register for inverting the signal level of the first and last bits of said second digital signal, said first gating means receiving said inverted digital signals and said second digital signal to output said first control signal in response to receiving the signals.

7. The character scanning system of claim 6 in which said second logic circuit means includes a first bi-stable device receiving the first bit of said second digital signal and a second bistable device receiving the last bit of said second digital signal, said first bi-stable device connected to said second bi-stable device and said second bi-stable device connected to said first bi-stable device whereby generation of the first bit of said second digital signal enables the operation of said first bi-stable device to output said second control signal, the operation of said first bi-stable device enabling the second bi-stable device to output said third control signal wherein said second and third control signals indicate the direction of scan of said scanning means.

8. The character scanning system of claim 7 in which said second and third control signals have opposite signal levels.

9. In combination with a processor for recognizing an unknown character on a document, a scanning apparatus comprising;

scanning means for scanning a document including rows of scanning members forming a multi-column, multi-row image of the unknown character wherein the first and last scanning members in each row detects the background area of the character when the character is centered and at least one other scanning members intermediate the first and last scanning members in a row detects a portion of a character, each of said scanning members outputting a voltage signal level;

means for detecting white, black and grey signal levels in said voltage signal levels in which the white signal level represents the background data of the character while the black and grey signal levels represents character data;

means responsive to the detection of said white, black and grey signal levels for generating first and second digital signals each representing background and character data;

a first storage member connected to said generating means for serially reading in said first digital signals and for outputting said first digital signals in parallel;

a second storage member connected to said generating means for serially reading in said second digital signals and for outputting said second digital signals in parallel;

a first latch member connected to said first storage member for storing said first digital signals when operated;

a second latch member connected to said second storage member for storing said second digital signals when operated;

first logic circuit means connected to said second storage member for generating a first control signal in response to receiving the second digital signals, said first control signal operating said first and second latch members for storing said first and second digital signals;

second logic circuit means connected to said second storage member for generating second and third control signals indicating the direction of scan of said scanning means in response to receiving the white signal level contained in the first and last bits of said second digital signals;

and a first bi-stable device connected to said first logic circuit means and operated by said first control signal for outputting a fourth control signal to the processing notifying the processor of the first and second digital signals stored in said first and second latch members.

10. The scanning apparatus of claim 9 in which the white signal contained on the first and last bits of said second digital signal represent zero binary bits generated upon the scanning of width of the character and said first logic circuit means includes a first gating member receiving the first and last bit of said second digital signal and said second digital signal for outputting said first control signal.

11. The scanning apparatus of claim 10 in which said second logic circuit means includes a second bi-stable device receiving the first bit of said second digital signal and a third bi-stable device receiving the last bit of said second digital signal, said second and third bi-stable devices being interconnected whereby the generation of the last bit of said second digital signal enables said second bi-stable device to output said second control signal, the operation of said second bi-stable device enabling said third bi-stable device to output said third control signal in which said second and third control signals indicate the scanning direction of said scanning means.

12. The scanning apparatus of claim 11 in which said second and third control signals have opposite signal levels.

13. A method for controlling the transfer data from a scanning apparatus to a character recognition apparatus comprising the steps of;
  scanning a character on a document;
  generating a multi-column, multi-row image of the character scanned in which the first and last columns of the image generated represent background area when the character is centered and at least one intermediate column represents a portion of the character;
  generating first digital signals in response to the generation of the first and last columns of the image of the character;
  generating second digital signals in response to the generation of an intermediate column of the image of the character;
  generating a first control signal in response to the generation of said first and second digital signals;
  storing said second digital signals representing the portion of the character scanned in response to the generation of said first control signal;
  and notifying the character recognition apparatus of the storing of the second digital signal in response to the generation of said first control signal.

14. The method of claim 13 which further includes the steps of generating second and third control signals indicating the scanning direction of the scanning apparatus in response to the generation of said first and second digital signals.

* * * * *

UNITED STATES PATENT AND TRADEMARK OFFICE
CERTIFICATE OF CORRECTION

PATENT NO. : 4,490,852
DATED : December 25, 1984
INVENTOR(S) : Ram N. Sahni

It is certified that error appears in the above—identified patent and that said Letters Patent is hereby corrected as shown below:

Column 7, claim 2, line 38, "claim 15" should be -- claim 1 --.

Column 7, claim 3, line 44, "claim 18" should be -- claim 2 --.

Signed and Sealed this

Twentieth Day of August 1985

[SEAL]

Attest:

DONALD J. QUIGG

Attesting Officer     Acting Commissioner of Patents and Trademarks